United States Patent
Shaner et al.

(10) Patent No.: US 6,222,112 B1
(45) Date of Patent: Apr. 24, 2001

(54) THERMIONIC CONVERTER TEMPERATURE CONTROLLER

(75) Inventors: Benjamin J. Shaner, McMurray; Joseph H. Wolf, Pittsburgh; Robert G. R. Johnson, Trafford, all of PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/382,203

(22) Filed: Aug. 23, 1999

(51) Int. Cl.$^7$ ...................................... H01L 35/00
(52) U.S. Cl. ................ 136/201; 136/202; 136/205; 136/242; 310/306
(58) Field of Search ........................... 136/201, 205, 136/208, 202, 242; 310/306

(56) References Cited

U.S. PATENT DOCUMENTS 3,493,792 * 2/1970 Untermyer, II ........................ 310/4
3,613,773 * 10/1971 Hall et al. .............................. 165/32

OTHER PUBLICATIONS

K–MAX: A Material with Exceptional Heat Transfer Properties, N. S. Rasor and J–L Desplat, IEEE, 1999, pp. 2847–2852, no month given.*

* cited by examiner

Primary Examiner—Kathryn Gorgos
Assistant Examiner—Thomas H Parsons
(74) Attorney, Agent, or Firm—John T. Lucas; William R. Moser; Paul A. Gottlieb

(57) ABSTRACT

A method and apparatus for controlling the temperature of a thermionic reactor over a wide range of operating power, including a thermionic reactor having a plurality of integral cesium reservoirs, a honeycomb material disposed about the reactor which has a plurality of separated cavities, a solid sheath disposed about the honeycomb material and having an opening therein communicating with the honeycomb material and cavities thereof, and a shell disposed about the sheath for creating a coolant annulus therewith so that the coolant in the annulus may fill the cavities and permit nucleate boiling during the operation of the reactor.

7 Claims, 3 Drawing Sheets

THERMIONIC CONVERTER TEMPERATURE CONTROLLER

BACKGROUND OF THE INVENTION

1. Field of the Invention

This invention relates to a device to control the temperature of a thermionic reactor over a wide range of operating temperatures. More particularly, this invention relates to a method and device for controlling nucleate boiling heat transfer between a cesium reservoir of a thermionic reactor and forced coolant flow within a thermionic reactor.

2. Description of the Related Art

The efficient operation of thermionic reactors has been an area of investigation. A conventional thermionic reactor converts the thermal energy of admitted electrons in a cesium plasma directly into electrical energy. The efficient operation of thermionic reactors with integral cesium reservoirs is partly dependent upon establishing and maintaining the reservoir temperature at an optimum value. However, it is difficult to maintain the optimum temperature over a wide range of thermal power levels when the coolant temperature is significantly lower than the reservoir temperature.

In the typical thermionic reactor, a significant coolant flow rate is required to limit the coolant temperature increase. Variations in bulk coolant temperature are created as the coolant picks up waste heat from successive convertors in the course of flowing from the inlet to the outlet of the reactor. This temperature increase may cause the convertors to operate at less than optimum temperatures, thus decreasing the overall efficiency of the plant.

To counter this problem, heat pipes have been used which accomplish heat transfer by phase change of the liquid. In a heat pipe, the heat input end of the heat pipe serves as an evaporator, with the heat causing the liquid to change to vapor. The vapor travels through a large open portion of the heat pipe, the center of which usually is devoid of any structure. The opposite end of the heat pipe is a condenser, which is cooled to condense the vapor and remove heat. The condensate is pumped back to the evaporator end via capillary induced flow in a porous structure. Heat pipes are characterized by a capillary induced flow feature.

Another concept is through the use of a material called K-MAX. K-MAX is described in "K-MAX: A Material with Exceptional Heat Transfer Properties", written by N. S. Rasor and J. L. Desplat in the *Proceedings of the 24th Intersociety of Energy Conversion Engineering Conference*, held in Washington, D.C., in August, 1989, the disclosure which is hereby incorporated by reference. K-MAX is similar to a heat pipe, in that it utilizes a capillary induced flow to return a condensate to a heated surface. It consists of a solid bi-porous material that employs two phase flow for heat transfer. The material has large interconnected pores, forming vapor transport channels, imbedded in a continuous liquid-soaked porous matrix, with much smaller interconnected pores forming liquid transport channels. The material may be formed into any shape, and can bear mechanical loads. In operation, heat is absorbed on the hot side of K-MAX by vaporization of liquid from small pores. The vapor flows through the large pores, condenses on the cold side, and the liquid returns to the hot side by wicking through the small pores.

The disadvantages of these two techniques is a required use of capillary induced flow, which is often too complex to implement. Thus, there is a need in the art for a heat transfer device which does not require capillary induced flow capability. Further, there is a need in the art for more efficiently maintaining the temperature of a thermionic convertor, regardless of the local bulk coolant temperature.

SUMMARY OF THE INVENTION

A principal object of the present invention is to provide a method and apparatus for maintaining the temperature of a thermionic convertor, regardless of the local bulk temperature.

It is a further object of the present invention to provide a heat transfer device which does not require capillary induced flow capability.

The above objects are achieved according to the present invention. A method and apparatus for controlling the temperature of a thermionic reactor over a wide range of operating powers includes a thermionic reactor having a plurality of integral cesiums reservoirs. A honeycomb material is disposed about the reactor, and has a plurality of separated cavities. A solid sheath is disposed about the honeycomb material, and has an opening therein which communicates with the honeycomb material and cavities thereof. A shell is disposed about the sheath and creates a coolant annulus therewith, so that the coolant in the annulus may fill the cavities to permit nucleate boiling during operation of the reactor.

These and other objects and advantages of the invention will be readily apparent in view of the following description and drawings of the above-described invention.

BRIEF DESCRIPTION OF THE DRAWINGS

The above and other objects and advantages and novel features of the invention will become apparent from the following detailed description of the preferred embodiment of the invention illustrated in the accompanied drawings, wherein.

DETAILED DESCRIPTION OF THE DRAWINGS

The present invention minimizes the temperature variation with power in thermionic reactors by using nucleate boiling at the heat transfer surface between the integral cesium reservoir and the forced coolant flow. One of the characteristics of nucleate boiling is that the heated surface temperature remains almost constant over heat fluxes ranging from the start of nucleate boiling up to the critical heat flux. The heated surface temperature corresponds to the saturation temperature, rather than the bulk coolant temperature. Thus, with nucleate boiling, the heated surface temperature will remain at the saturation temperature regardless of the power level of the reactor and the bulk coolant temperature. Saturation temperature is dependent upon pressure, and may be significantly higher than the bulk coolant temperature.

For a large network of thermionic convertors in a small volume, coolant flow velocity must usually be high in order to remove the total amount of waste heat from the network. However, to obtain nucleate boiling over the range of heat fluxes typical of thermionic convertor operation, the flow velocity needs to be relatively low when using a coolant having a temperature several hundred degrees Fahrenheit below the heat transfer surface temperature. The present invention permits nucleate boiling to occur on a heated surface at low heat fluxes, while transferring the heat into a subcooled forced flow coolant heat sink at significantly lower temperatures than the heated surface. The concept is called variable thermal conductivity (VTC).

Figure 1:
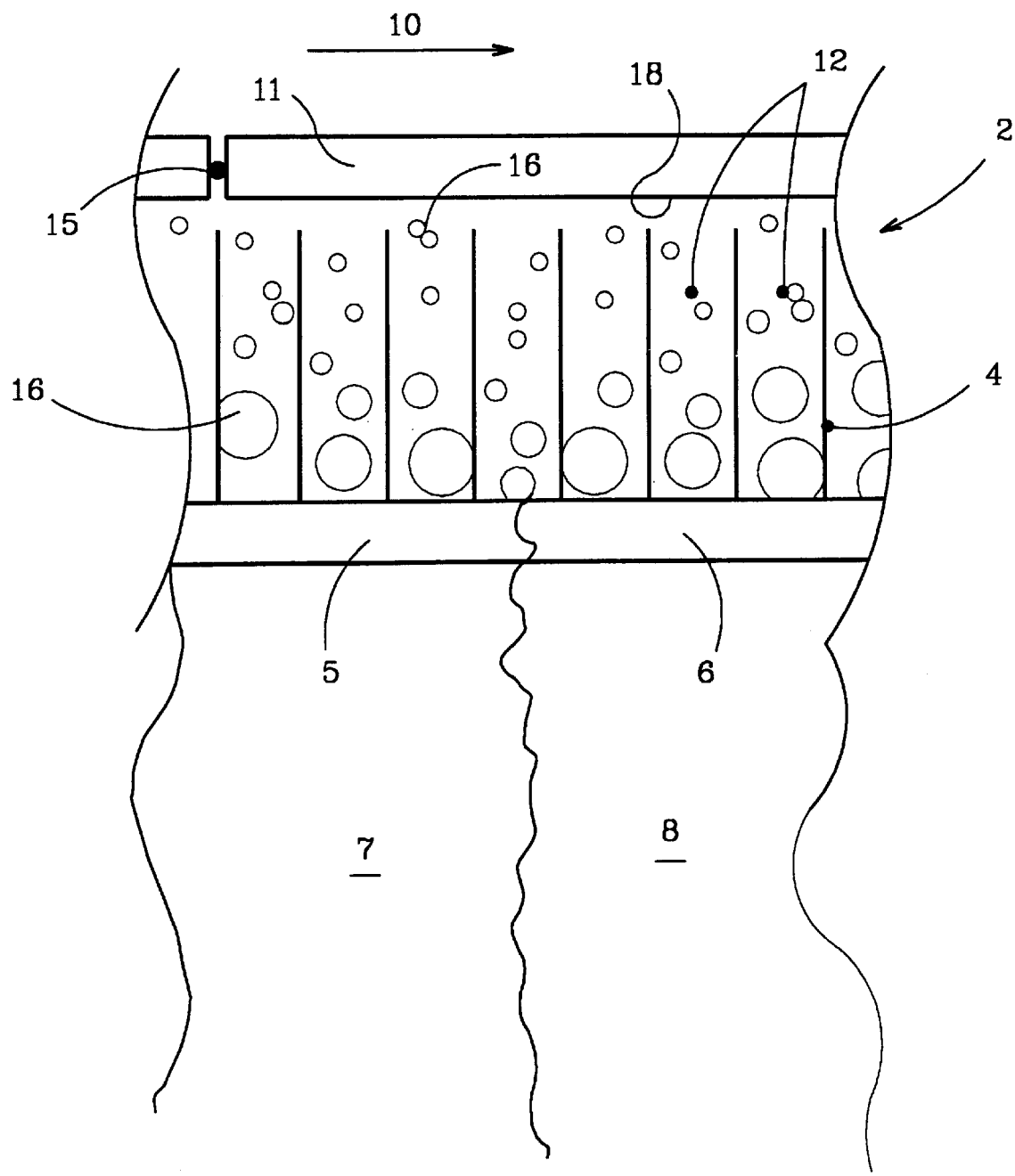
FIG. 1 is a cross-sectional view of the present invention.

As best illustrated in FIG. 1, VTC device 2 is comprised of a structural material in the form of a plurality of dividers 4. Dividers 4, which are equally spaced, separate heated surfaces 5 and 6 of cesium reservoirs 7 and 8, from forced coolant flow 10. Dividers 4 radially extend from the periphery of heated surfaces 5 and 6 and terminate proximate to sheath 11, which surrounds the VTC device 2. Because of this spacing, a layer of water is essentially trapped between heated surfaces 5 and 6 and forced coolant flow 10.

Small cavities 12 are formed between dividers 4, and are small enough to prevent natural convection within cavities 12. Cavities 12 are vented to coolant flow by way of VTC expansion hole 15. At zero flux, the temperature throughout the VTC device 2 will be uniform at the coolant temperature. As heat flux increases, the temperature on the heated surfaces 5 and 6 of cesium reservoirs 7 and 8 will increase until nucleate boiling begins. The heat flux at the onset of nucleate boiling is a function of the thickness of the trapped water region, and the heat transfer throughout the VTC device 2. The temperature of the heated surfaces 5 and 6, where nucleate boiling begins, is based upon the operating pressure of coolant flow 10.

Once nucleate boiling begins, then pool boiling occurs in cavities 12 with very turbulent fluid action. Steam bubbles 16 are generated as pool boiling begins. The heat is transferred to sheath 11 via saturated steam bubbles 16, with the steam condensing onto inner surface 18 of sheath 11. The heat is transferred by conduction through sheath 11, and is removed by convection as a result of coolant flow 10. VTC expansion hole 15 permits cavities 12 to be vented to coolant flow 10 to allow the pressure in cavities 12 to equalize with coolant flow 10. The volume of water in cavities 12 will decrease as the heat flux increases and more steam is produced. As long as the heat removal rate at sheath 11 is sufficient, cavities 12 will not dry out. The fluid action needed to keep the heated surface 5 and 6 wetted with water is supplied by the turbulence created by the violent boiling action.

Figure 2:
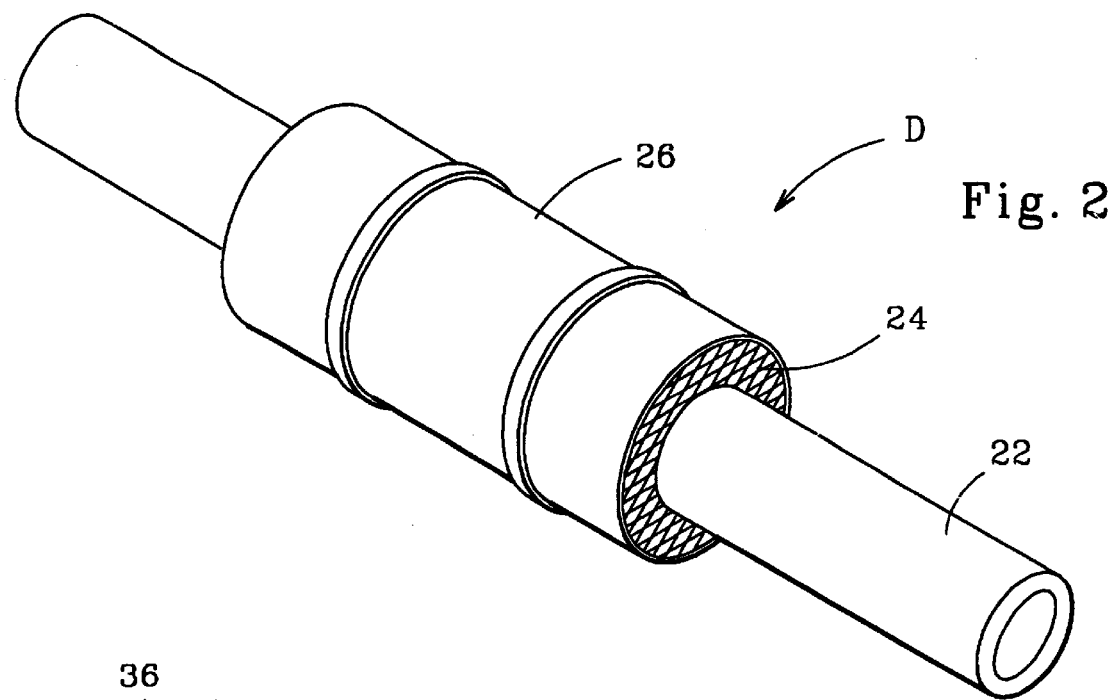
FIG. 2 is a perspective view of a demonstration device of the preferred embodiment.
Figure 3:
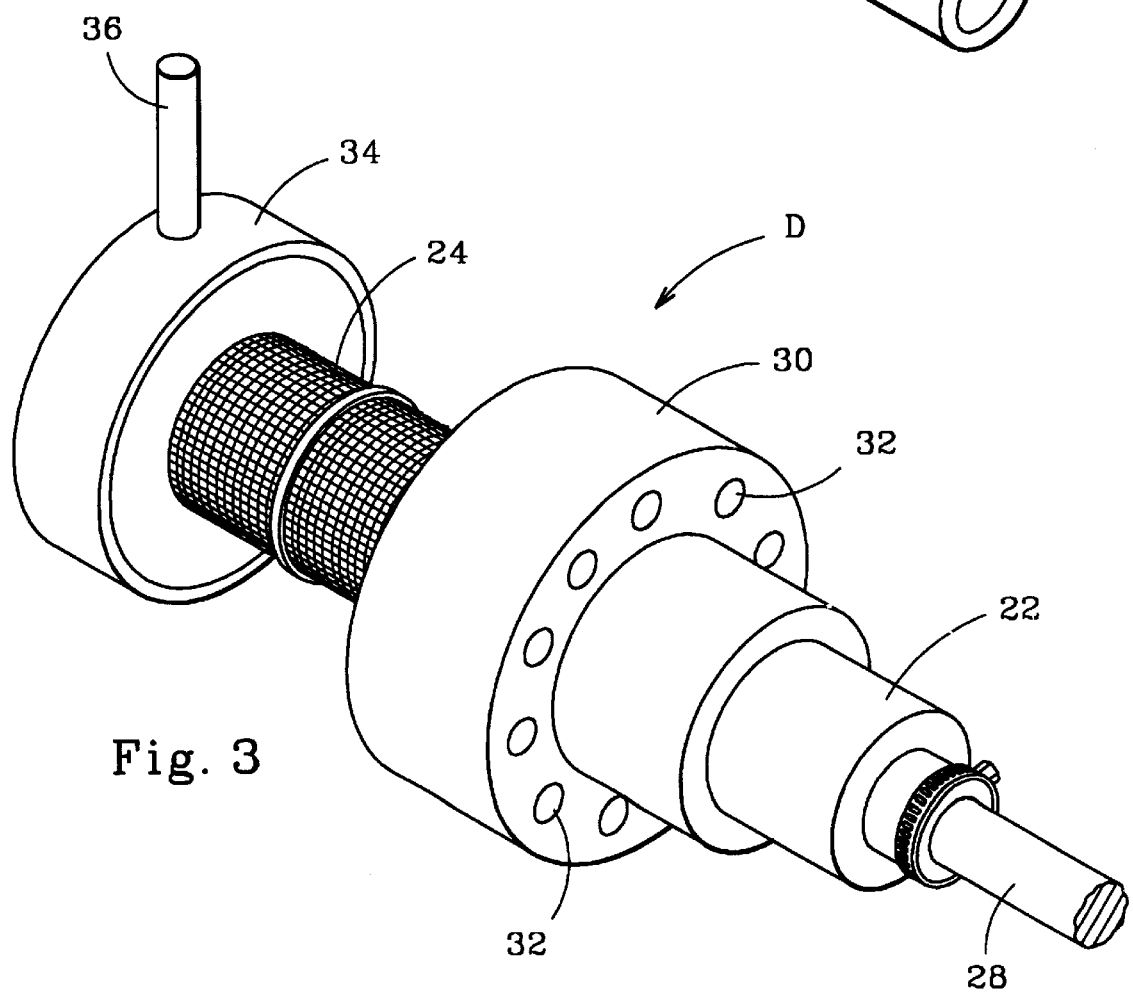
FIG. 3 is a perspective view of the demonstration device together with a device to produce a forced annulus flow across the surface of the demonstration device.

With particular reference to FIGS. 2 and 3, a demonstration device D was made according to the present invention. The device consisted of a 1.6 inch diameter tube 22 which was approximately 10 inches long. Honeycomb material 24, corresponding to the structural material 4, was wrapped around tube 22 to create cavities for boiling. Solid sheath 26 was installed around honeycomb material 24 to seal the cavities from the fluid flow.

To test demonstration device D, tube 22 was mounted horizontally in a stainless steel tank. The inner wall of tube 22 was heated using a cartridge-style electrical resistance heater 28 inserted into tube 22. End cap 30, with apertures, was positioned at one end of demonstration device D. End cap 34, with pipe 36, was positioned at the opposite end of demonstration device D. Clear Lexan sleeve (not shown) joins end caps 30 and 34, creating an annulus for forced convection flow on the outside of demonstration device D. Solid sheath 26 is not shown in FIG. 3 only to illustrate the honeycomb material 24, but is needed in the operation of demonstration device D. Pipe 36 was secured perpendicular to the annulus flow, on the outer surface of sleeve 34, for introducing water into the annulus. Water from the tank (not shown) was pumped through pipe 36 for annular flow across the solid sheath 26, and returned to the tank through apertures 32. The heatsink for demonstration device D was the water inside the tank, which was kept cool with a cooling coil. Thermocouples were attached to the surface of the heated tube to provide heated surface temperature readings. The heat flux from the heated surface was inferred by measuring the power input to the heater and the heated surface area.

Figure 4:
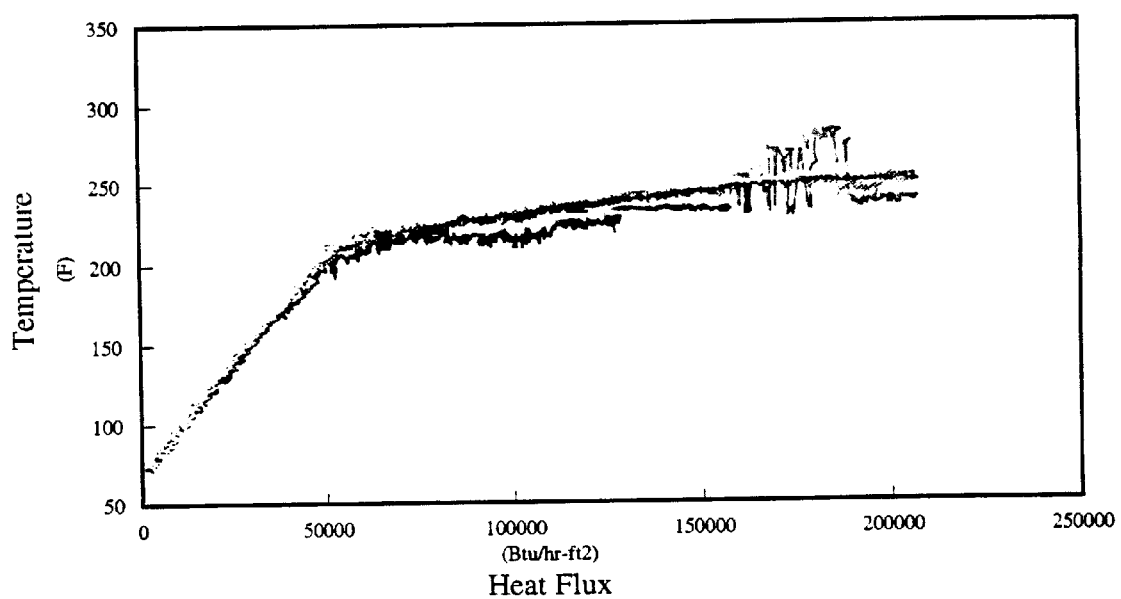
FIG. 4 is a graphical representation of temperature versus heat flux of the demonstration device.

Demonstration device D was tested to a heat flux of 200,000 btu/hr-ft.$^2$. The results are shown with reference to FIG. 4. The effect of the onset of nucleate boiling is clearly visible at 50,000 btu/hr-ft.$^2$, with negligible change in heated surface temperature through the maximum heat flux. The nearly constant temperature of the heated surface over a wide range of heat flux demonstrates the viability of the variable thermal conductivity concept. The cylindrical geometry of demonstration device D resulted in the spaces between dividers 4 being orientated in various angular configurations from vertically upward to vertically downward. Even though a downward facing cavity might be expected to overheat, since the steam would rise due to buoyancy, demonstration device D performed equally as well with upward and downward facing cavities. This was believed to be due to the turbulence created by the buoyant boiling action dominating the buoyancy forces, thus keeping the heated surface wetted with water.

Another advantage to utilizing the VTC device 2 in a thermionic reactor is that it achieves the same temperature on every thermionic convertor, regardless of the local bulk coolant temperature. Because the temperature within the VTC device 2 is dependent upon the saturation temperature and not the bulk coolant temperature, the temperature of all of the convertors would be the same regardless of the bulk coolant temperature. Thus, the required flow rate of the bulk coolant can be lowered.

The VTC device 2 may be used in other applications where it is desired to dissipate large amounts of heat while maintaining the temperature of the hot component at a temperature significantly higher then the coolant temperature. This is accomplished using nucleate boiling heat transfer at heat fluxes lower than those normally associated with nucleate boiling. The disclosed invention may be used where heat pipes are considered, yet has the advantage of a simplistic construction because it does not depend on capillary induced flow.

While this invention has been described as having a preferred design, it is understood that it is capable of further modifications, uses, and/or adaptations of the invention following the general principle of the invention, including such departures from the present disclosure as come within known or customary practice in the art to which the invention pertains, and as may be applied to the central features herein before set forth, and fall within the scope of the invention of the limits of the appended claims.

We claim:

1. A method for controlling the temperature of a thermionic reactor over a wide range of operating power, comprising the steps of:

a) providing a thermionic reactor having a plurality of integral cesium reservoirs;

b) surrounding the reservoirs with a honeycomb material having a plurality of cavities therein;

c) positioning an apertured sheath about the material;
d) positioning a shell about the sheath and therewith forming a coolant fluid annulus;
e) communicating coolant fluid to the annulus and through the apertures to the cavities; and
f) operating the reactor and causing the reservoirs to be heated to a temperature sufficient to cause nucleate boiling of the coolant fluid to occur in the cavities.

2. The method of claim 1, further including the step of:
a) spacing the cavities with dividers.

3. The method of claim 2, further including the step of:
a) providing water as the coolant.

4. The method of claim 3, further including the step of:
a) permitting expansion through the apertures.

5. Temperature controller for a thermionic reactor, comprising:
   a) a thermionic reactor having a plurality of integral cesium reservoirs;
   b) a honeycomb material disposed about said reactor, said honeycomb material having a plurality of separated cavities;
   c) a solid sheath disposed about said honeycomb material and having an opening therein communicating with said honeycomb material and cavities thereof; and
   d) a shell disposed about said sheath for creating a coolant annulus therewith so that said coolant annulus may fill said cavities to permit nucleate boiling during operation of said reactor.

6. The temperature controller of claim 5, further comprising:
   a) means for separating said cavities.

7. The temperature controller of claim 6, wherein;
   a) said means for separating said cavities terminate proximate to said solid sheath.

* * * * *